United States Patent [19]

Hartmann

[11] 4,109,784

[45] Aug. 29, 1978

[54] CONVEYOR BELT WITH CORRUGATED SIDEWALLS

[76] Inventor: Karl Hartmann, Baerler Strasse 17, 4130 Moers, Fed. Rep. of Germany

[21] Appl. No.: 761,536

[22] Filed: Jan. 21, 1977

[30] Foreign Application Priority Data

Jan. 24, 1976 [DE] Fed. Rep. of Germany ....... 2602613

[51] Int. Cl.² ............................................. B65G 15/40
[52] U.S. Cl. .................................................... 198/821
[58] Field of Search ......................... 198/844, 820, 821

[56] References Cited

U.S. PATENT DOCUMENTS

| | | | |
|---|---|---|---|
| 1,824,858 | 9/1931 | Williams | 198/844 |
| 2,711,815 | 6/1955 | Lorig | 198/844 |
| 3,750,864 | 8/1973 | Nolte | 198/820 |

FOREIGN PATENT DOCUMENTS 1,446,474  11/1966  France ..................................... 198/820

*Primary Examiner*—Joseph E. Valenza
*Attorney, Agent, or Firm*—Michael J. Striker

[57] ABSTRACT

An endless flexible conveyor belt has a load-supporting portion and two upstanding side walls thereon. The sidewalls are corrugated, each being formed with a plurality of transverse major folds at least some of which have one or more minor or auxiliary folds incorporated in them.

11 Claims, 12 Drawing Figures

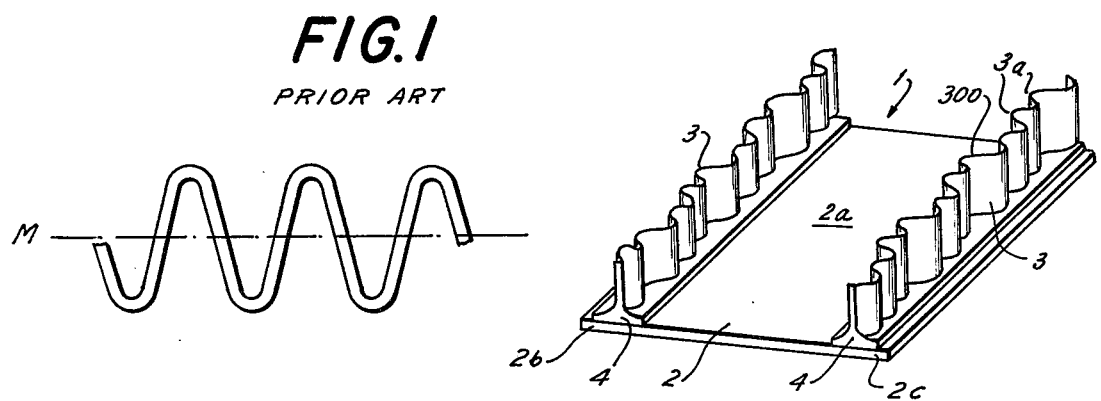
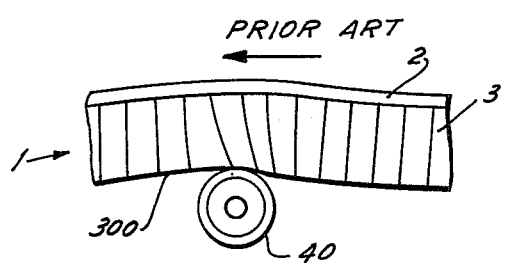
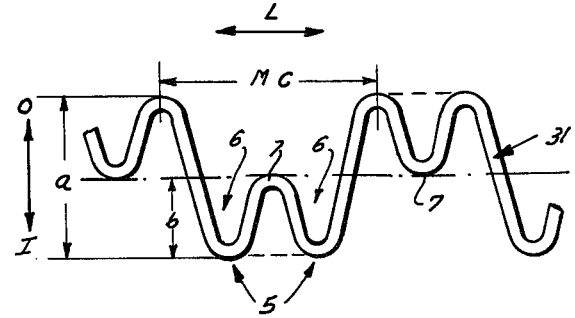
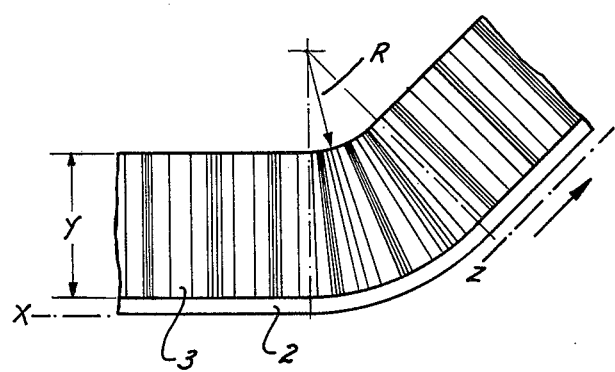
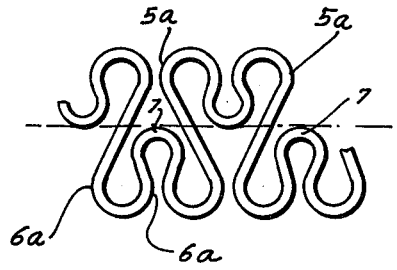

CONVEYOR BELT WITH CORRUGATED SIDEWALLS

BACKGROUND OF THE INVENTION

The present invention relates to an endless flexible conveyor belt.

More particularly, the invention relates to an endless flexible conveyor belt of the type which is of box-shaped or trough-shaped cross-section, i.e., which has a bottom wall and side walls which extend upwardly from the same.

Still more particularly, the invention relates to such an endles flexible conveyor belt which has side walls provided with corrugations.

Conventional endless conveyor belts are, in their simplest execution, endless strips of flexible material which are trained about reversing rollers. There are many types of materials which can not be conveyed on these belts, because they drop off the lateral edges of the belt.

To avoid this problem it has been proposed to utilize an endless conveyor belt of box-shaped or trough-shaped cross-section, i.e., a belt having the usual strip-shaped supporting portion which is smooth and is trained about smooth drum-shaped reversing rollers and sidewalls which project normal or otherwise inclined to the plane of the supporting portion. This type of belt is especially advantageous for applications where material is to be transported between two or more levels, e.g., a higher level and a lower level.

However, when the conveyor belt is deflected from one level to another level, it is necessary that the sidewalls be able to accommodate themselves to the change of direction which takes place at each point of deflection, i.e., depending upon the direction of deflection the sidewalls must be able to longitudinally stretch or undergo compression. To facilitate this it has been proposed to corrugate the sidewalls transversely to their elongation, so that the resulting folds are either pulled apart (i.e., stretched) or squeezed together (i.e., compressed), depending upon the direction of deflection. It will be evident that the degree of stretching or compression is the greater the higher the sidewalls are; the reason for this is an increase in the height of the sidewalls also results in increasing spacing of the upper free edges of the sidewalls from the neutral bending zone of the belt which in the known conveyor belts lies within the bottom wall or strip of the belt.

This, in turn, dictates the deflection radius required for deflecting the belt where the belt changes direction. For example, a known conveyor belt of the type under discussion, having sidewalls of about 300 mm height, requires a deflection radius of about 750 mm to be deflected from the horizontal into the vertical. This translates into a need for deflecting drums having a diameter of 1500 mm. When this belt is deflected around these drums the sidewalls are longitudinally compressed; the limit of possible compression is evidently reached when the adjacent folds of the corrugation move into surface-to-surface abutment with one another. This is of course generally true of all corrugated sidewalls, whether high or low, which are required to continue to extend substantially normal to the bottom wall at all times, i.e., even during deflection. The use of sidewalls which are so profiled that they fold over laterally during deflection of the conveyor belt, has been proposed but is almost completely discontinued in the industry because of their susceptibility to damage and their low ability to retain conveyed materials against spilling.

Conversely, during deflection of the belt from the upper run to the lower run or vice versa a longitudinal stretching of the sidewalls takes place. The folds formed by the corrugations open up but this is of course limited to the degree of stretching achieved at the time the sidewalls have become completely flat, i.e., until the folds have been stretched flat. The degree of stretching is therefore limited by the amount of sidewall material which is "stored" in the folds. Evidently, additional material could be "stored" in this manner by increasing the depth of the corrugations, i.e., the depth of the folds in transverse direction of the belt. This, however, results in a corresponding decrease of the available load-carrying space of the belt; if one seeks to maintain that space unchanged, then the only alternative solution is to make the overall width of the belt correspondingly greater. A decrease in the load-carrying space is evidently undesired whereas an increase in belt width is often unacceptable because of space limitations at the point of use; also, belt widths are generally fixed by industrial and/or government norms.

The corrugating of sidewalls is also governed by other considerations. Thus, if the corrugated sidewall projects upwardly from the bottom wall by a distance greater than about 160 mm, it must be made specially resistant to folding-over in the lateral direction. Until now this was achieved by simply widening the corrugations in longitudinal direction of the sidewall, i.e, by making them wider in that direction than would otherwise be the case. However, this leads to deeper folds and a concomitant loss of carrying capacity. Moreover, conveyed matter tends to settle in such deep folds and, after unloading of the belt, travels along in the return run and becomes scattered during such travel.

In my prior U.S. Pat. No. 3,464,538 I have attempted to counteract the above problem by filling the sidewall folds at least partially with an elastic material to obtain improved stability and a better self-cleaning effect of the folds. However, I have found it to be a disadvantage of that construction that greater amounts of material are required to construct the belt and that the overall belt weight is increased. Moreover, the lateral sidewall stability can be economically improved only up to a sidewall height of about 200 mm in that manner.

The ability of a corrugated conveyor sidewall to undergo compression and extension in respect of the deflection radius for the belt, is largely a function of the geometry of the corrugation. The known solutions are not satisfactory, especially in the case of conveyor belts intended for large-volume conveying applications.

Also, known belts of this type exhibit markedly poor roll performance, which is defined as the ability of the sidewalls to be supported and roll on supporting rollers located beneath the return run of the conveyor. Conventionally, the free edges of the folds of the sidewalls are supported on cylindrical rollers as they travel in the return run but, because of the too great distance from one fold to the next and the too great depth of the folds, the sidewalls tend to flex in direction opposite the movement of the return run. This results from the point contact pressure transmission and leads to increasing destruction of the originally smooth contact surfaces on the sidewalls. As the damage proceeds the contact surfaces become progressively more uneven and this, in turn, leads to increasing damage to the support rollers. Ultimately this causes vibrations which are transmitted to the entire conveying installation. Short of using very expensive auxiliary equipment to counter these problems, there is nothing that can be done in the prior art to avoid them.

Another disadvantage of the prior art is that the construction principles employed in these conveyors often make it impossible to produce corrugated-sidewall conveyors for special conveying applications. Yet, the increasing use of corrugated-sidewall conveyors has opened up many new fields of applications and industry is constantly asking the belt manufacturers to provide such belts for new conveying applications. For example, it is currently being requested that corrugated-sidewall belts be furnished which have a width of 4000 mm and a sidewall height of 1000 mm; these belts are, however, required for use in situations where little vertical space is available so that the large 1200 mm-diameter reversing drums ordinarily required cannot be used. The only possible compromise is to use smaller reversing drums having a diameter of only about 400 mm. Moreover, such belts have a high inherent weight which makes it impossible to support the return run on rollers, requiring instead separate supporting belts for the return run. These, in turn, require additional vertical space for their installation.

It can be concluded, then, that the ability of the corrugated sidewalls to compress and to extend is the factor which governs the diameter of deflecting drums that can be used, the deflection radius required for deflection of the belt from one level to another, and the amount of vertical space required for installation and operation of the belt. The service life of the belt is largely dependent on the corrugation profile of the sidewalls and the ability of the corrugated sidewalls to resist deformation resulting from pressures acting upon them from various directions.

SUMMARY OF THE INVENTION

It is a general object of the invention to overcome the disadvantages of the prior art.

More particularly, it is an object of the invention to provide a conveyor belt having corrugated sidewalls of improved ability to undergo extension (stretching) and/or compression.

The conveyor belt according to the invention is to be able to undergo deflection about small-diameter belt drums and/or through small deflection radii, even if the sidewalls of the belt are higher or very high.

The sidewalls of the improved conveyor belt are to have the longest possible service life, and to be highly resistant to vertical and lateral pressures acting upon the heads and flanks of the sidewall corrugations.

Furthermore, the corrugated sidewalls of the novel conveyor are to have improved self-cleaning ability.

In pursuance of these objects, and of others which will become apparent hereafter, one feature of the invention resides in an endless flexible conveyor belt, comprising an elongated bottom wall, and a pair of elongated sidewalls projecting from the bottom wall inclined thereto and defining with the bottom wall a material-accommodating cavity extending lengthwise of the belt, the sidewalls being laterally corrugated and each having a plurality of longitudinally spaced major folds, at least some of the major folds having at least one minor fold incorporated therewithin.

The construction principle employed in the novel conveyor belt makes it possible to meet all of the objects of the invention. It proposes that the major folds are subdivided, in accordance with the particular requirements by including in them minor or auxiliary folds. The folds may extend inwardly or outwardly with respect to a longitudinal center line of the belt. When the sidewalls are corrugated in the proposed manner, their folds exhibit optimum stretching ability and this makes it possible to deflect the belt through small deflection radii and about small-diameter reversing drums.

Due to the employment of both major and minor folds it is possible to store in a major-minor fold combination a sidewall length corresponding to the length which in the prior art is stored by a single fold. However, due to the major-minor fold combination the maximum lateral (i.e., transverse) fold depth is substantially smaller than would be required for the single fold according to the prior art. Further, the sidewalls can be so constructed that, depending on their height, their compressibility is improved by up to 30% over the prior art. This permits the use of rather high sidewalls but yet makes possible the use of small delfecting radii when the belt is deflected from one level to another level.

Insofar as the return run on the belt is concerned, the provision of the minor folds substantially improves the roll behavior of the sidewalls over supporting rolls; it also increases the wear resistance of the sidewalls. The number of areas where flexing occurs in the sidewalls is increased by the invention and this results in an improved self-cleaning ability of the belt. If desired with respect to the behavior during travel in the return run, the sidewalls may be made wider than previously customary so as to improve their stability in all directions, increase their resistance to deformation at the head of the corrugations, and improve their roll behavior.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a diagrammatic top-plan view showing a sidewall corrugation according to the prior art;

FIG. 2 is a fragmentary side view, showing a portion of a return run of a prior-art conveyor;

FIG. 3 is a fragmentary side view, illustrating the behavior of a sidewall in the region where the belt is deflected out of its plane of movement;

FIG. 4 is a fragmentary perspective of a conveyor belt embodying the invention;

FIG. 5 is a diagrammatic top plan view illustrating a currently preferred type of corrugation for the sidewalls of my conveyor belt;

FIG. 6 is a view of FIG. 5, but showing the corrugation in longitudinally compressed condition;

DESCRIPTION OF PREFERRED EMBODIMENTS

Figure 7:
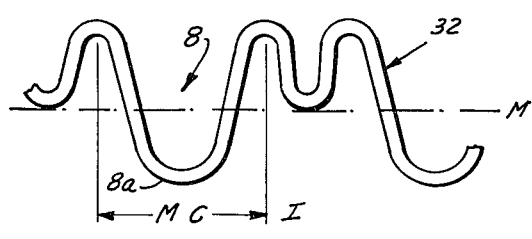
FIG. 7 is a view similar to FIG. 5 but showing a different embodiment.

In FIG. 1 I have illustrated the prior-art type of corrugated sidewall in which all of the corrugations or folds are uniform, both relative to one another and also as to their depth relative to a center line M. That center line M, it should be understood, extends parallel to the longitudinal center line of the conveyor belt. This construction has all the disadvantages which have been fully outlined hereinbefore.

FIG. 2 shows a prior art conveyor 1 in side view. In particular, it illustrates a portion of the return run where the sidewalls 3 (one shown) extend downwardly from the bottom wall 2 (i.e., the actual load-supporting belt) and the heads 300 of the corrugations of the sidewalls are rollingly supported on idler rollers 40 (one shown). The direction of movement of the return run is indicated by the arrow, and the undesirable deflection of the sidewall corrugations in direction counter to the advancement is clearly evident.

FIG. 3 shows, for purposes of further explanation, a portion of a conveyor belt 1 where the bottom wall 2 and the corrugated sidewalls 3 (one shown) are deflected out of the horizontal plane of movement X into an inclined plane of movement Z so that the conveyor 1 can bridge two vertically spaced operating levels. The height of the corrugated sidewalls 3 is identified by reference character Y.

The deflection radius R, through which the belt 1 is deflected from the plane X into the plane Z, is determined by the height Y of the sidewalls 3 as well as — and this is important — the degree to which the corrugations of the sidewalls can be compressed during deflection. The compression which takes place is clearly illustrated in the Figure. Of course, if the deflection were the reverse of that illustrated, that is to say if the belt 1 were to be deflected from the plane X downwardly into an inclined plane Z, then it would be the degree of extensibility (stretch) of the corrugations of sidewalls 3 that would be important.

Conveyor belts constructed according to the invention, as for example explained below with reference to FIGS. 4-12, permit a much smaller deflection radius R to be employed — and hence required deflecting or reversing drums of smaller diameter — than those according to the prior art.

FIG. 4 illustrates the general appearance of a conveyor belt 1 according to the present invention. It has a bottom wall 2 (i.e., a strip-shaped material-supporting belt) which as a rule is smooth and from the material-supporting surface 2a of which there rise two sidewalls 3 which are secured to the surface 2a at the edge portions 2b, 2c thereof with their bases 4. The securing can be effected by adhesive bonding, cross-linking, vulcanizing or by mechanical means.

The sidewalls 3 are corrugated in a particular manner, in accordance with the present invention. The corrugations are identified with reference numeral 3a and the free edges of the sidewalls 3 are designated with reference numeral 300.

FIGS. 5 and 6 show a currently preferred embodiment of the sidewall corrugations. The sidewall is identified with reference numeral 31 and its longitudinal direction indicated by the arrow L. Character I identifies the inside of the belt, i.e. the load-receiving space between the two sidewalls, and character O refers to the outside. However, insofar as the deflection of the folds towards the inside and the outside is concerned, this relationship could also be reversed, i.e. the advantages of the invention would obtain even if the locations of the inside and the outside were reversed.

Each sidewall 31 (only one shown) has a plurality of longitudinally successive main corrugations or folds MC; each of these is composed of a wave 5 and a depression 6. The depth (in direction normal to the elongation L) of the main corrugations MC is determined by the distance $a$ between the tips of the waves 5 and the lowest points of the depressions 6. In this embodiment each of the main corrugations MC is augmented in its apex region by an auxiliary or minor fold 7 which is deflected in direction towards the longitudinal center line M of the main corrugations MC. The depth of the minor folds is designated with $b$ and corresponds to approximately one-half of the depth $a$.

Due to the presence of the minor corrugations 7 each main corrugation MC stores a length of sidewall 31 which corresponds to the fully extended length of the wave 5, depression 6 and minor fold 7. In other words, a greater length of sidewall 31 is stored than would be possible without the presence of minor folds 7, assuming that the size of the main folds MC were to remain unchanged. The types of corrugations shown in FIG. 5 make it possible to store a substantial length of sidewall 31 in each corrugation composed of main fold MC and minor fold 7 but yet to have only a relatively small transverse depth $a$ while obtaining optimum ability of the sidewalls to extend and compress.

The compression state is shown in FIG. 6 for explanation. It will be noted that the flanks 5a of the waves 5 and the flanks 6a of the depressions can be moved into abutment to one side of the space taken up by the respective minor fold 7, so that less space is required despite the greater storage capability. Also, the folds 7 substantially improve the stability of the walls 31 against pressures from any and all directions, due to the increased number of abutment points per corrugation, and this is especially advantageous in the case of pressures acting on the flanks of corrugations in high sidewalls.

Further, due to the presence of the folds 7 the number of flexing points of the sidewalls is increased and this enhances the self-cleaning ability of these walls. A deflection of the (more resistant) sidewalls in or opposite to the direction of travel, especially in the return run (see FIG. 2), is less readily possible and the resistance of the sidewalls to deformation is increased.

FIG. 7 shows an embodiment which is similar to that of FIG. 5, except that only every second one of the main corrugations MC of sidewall 32 is provided with a minor fold 7 which is deflected in direction towards the center line M. This configuration is especially suitable for applications where it is the longitudinal extensibility (rather than compressibility of the sidewalls 32 which is of particular importance, and where a very good self-cleaning effect is required. Because of this improved self-cleaning effect it is advantageous if the apex 8a of the wave 8 faces the inside I whereas the depression 8b faces outwardly and does not come in contact with the conveyed material.

Figure 8:
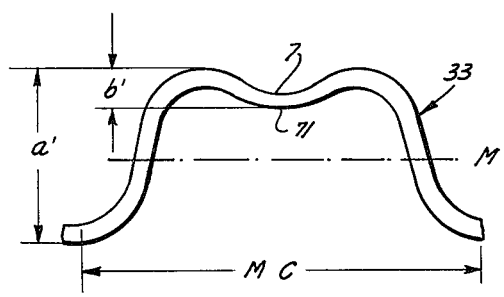
FIG. 8 is a diagrammatic top plan view, showing a further embodiment.

In FIG. 8 I have illustrated an embodiment wherein the sidewall 33 again has main corrugations MC (one shown) which are each perforated with a minor fold 7. Here, the thickness of wall 33 is reduced at the apex region 71 of the minor folds 7. If, for example, the wall thickness is about 6 mm elsewhere, the thickness in region 71 would be about 4 mm, e.g., about one-third less, although this ratio is not to be considered binding but is exemplary only. The depth $b'$ of the folds 7 is equal to only about one-fourth of the depth $a'$ of the main corrugations MC.

The reason for the reduced wall thickness will be evident. The force required to fully stretch (i.e. extend) the wall 33 to flat or substantially flat condition must be greater in the region of the minor folds 7 than elsewhere. Therefore, if the wall thickness is reduced as described, then the stretching (as the belt passes about a deflecting or reversing drum) will be more uniform.

Figure 9:
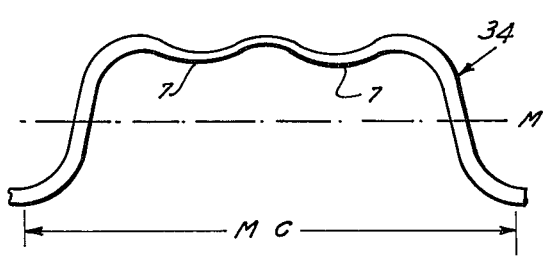
FIG. 9 is a view similar to FIG. 8 but illustrating yet another embodiment.

The embodiment of FIG. 9 is a modification of the one in FIG. 8, from which it differs in that the main corrugations MC (one shown) of sidewall 34 are each provided with two minor folds 7, the wall thickness of sidewall 34 being reduced throughout the area in which the folds 7 are formed.

Figure 10:
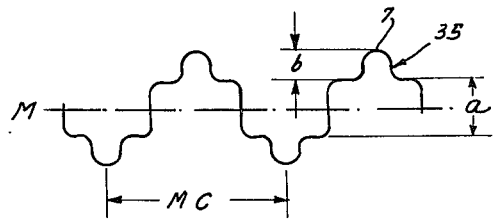
FIG. 10 is a schematic top-plan view showing a modification of the embodiment in FIG. 5.

FIG. 10 shows an embodiment for special applications. For example, belts which have a width of 3 or 4 meters and sidewalls having a height of about 1 meter, are so heavy that in the return run they must be supported by supporting belts or straps. This requires corrugations of great transverse depth; however, corrugations havings this characteristic tend to accumulate substantial amounts of conveyed material which settles in them.

The embodiment in FIG. 10 counteracts this by providing each sidewall 35 with the illustrated main corrugations MC and minor folds 7. The relative depths are indicated at $a$ and $b$. In this embodiment the number of flexing points is greatly increased so that the accumulation of conveyed material is avoided or at least substantially reduced.

Figure 11:
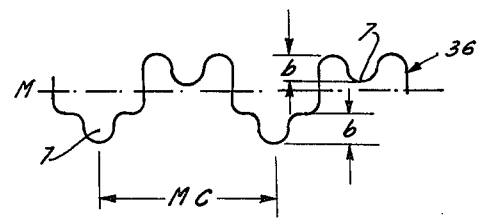
FIG. 11 is a view similar to FIG. 10 but illustrating an additional embodiment.

FIG. 11 shows an embodiment wherein sidewall 36 is provided with main corrugations MC and with minor folds 7 of the arrangement and shape as illustrated. This embodiment is especially advantageous if high extensibility and compressibility are needed in conjunction with improved sidewall stability, but if relatively small transverse corrugation depth is desired.

Figure 12:
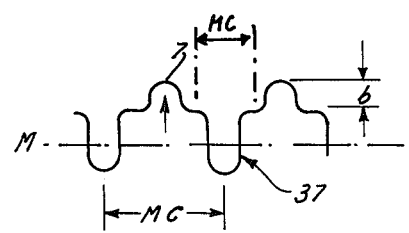
FIG. 12 is a view analogous to FIG. 11 but illustrating a modification of the embodiment shown in FIG. 7.

FIG. 12, finally, illustrates still a further embodiment in which only every second main corrugation MC of sidewall 37 is provided with a minor fold 7 which extends in direction outwardly. This embodiment is characterized by excellent self-cleaning ability and extensibility but does not offer improved compressibility.

No details are provided concerning the materials used for the belts, including the sidewalls, since such materials are conventional in this art and the particular type of material does not form part of the invention. In other words: all materials conventionally used for flexible endless conveyor belts can be employed. Of course, the belt may also be reinforced, e.g., with textile material, metal fabrics, cords, fibrous sliver or natural or synthetic floc mixed in with the belt material.

While the invention has been illustrated and described as embodied in a conveyor belt of box-shaped or trough-shaped cross-section, it is not intended to be limited to the details shown since various modifications and structural changes may be made without departing in any way from the spirit of the present invention.

Without further analysis, the foregoing will so fully reveal the gist of the present invention that others can, by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An endless flexible conveyor belt, comprising an elongated bottom wall; and a pair of elongated sidewalls projecting from said bottom wall inclined thereto and having longitudinal edges remote therefrom said sidewalls defining with said bottom wall a material-accommodating cavity extending lengthwise of the belt, said sidewalls being laterally corrugated and each having a plurality of longitudinally spaced major folds, at least some of said major folds having at least one minor fold incorporated therewithin, each of said minor and major folds having a substantially constant cross-sectional shape and size over their height intermediate said bottom wall and said edges and said minor folds having cross-sectional dimensions which differ from those of said major folds, the presence of said minor folds reinforcing said sidewalls against lateral deflection and also enhancing the ability of said sidewalls to undergo longitudinal compression and expansion during movement of the belt from one into another plane of travel.

2. A conveyor belt as defined in claim 1, wherein said cavity is box-shaped.

3. A conveyor belt as defined in claim 1, wherein said cavity is trough-shaped.

4. A conveyor belt as defined in claim 1, wherein said major folds each have an apex region, said minor folds being formed in said apex region and extending in direction inwardly towards a longitudinal center line of said bottom wall.

5. A conveyor belt as defined in claim 1, wherein said major folds each have an apex region, said minor folds being formed in said apex region and extending in direction outwardly away from a longitudinal center line of said bottom wall.

6. A conveyor belt as defined in claim 1, wherein said major folds each have an apex region, said minor folds being formed in said apex region and extending partly in direction inwardly towards and partly in direction outwardly away from a longitudinal center line of said bottom wall.

7. A conveyor belt as defined in claim 1, wherein the lateral depth of said minor folds is smaller than that of said major folds.

8. A conveyor belt as defined in claim 1, wherein the lateral depth of said minor folds is less than half the lateral depth of said major folds.

9. A conveyor belt as defined in claim 1, wherein the thickness of said sidewalls is non-uniform in longitudinal direction of said sidewalls.

10. A conveyor belt as defined in claim 1, wherein the thickness of said sidewalls is less where said minor folds are formed than elsewhere on the sidewalls.

11. A conveyor belt as defined in claim 1, wherein said minor folds also have respective apex regions where the thickness of said sidewalls is less than elsewhere on the sidewalls.

* * * * *